March 23, 1937.  H. F. CONGABLE  2,074,502
SHEET METAL GATE FOR IRRIGATION PIPE
Filed Dec. 14, 1934
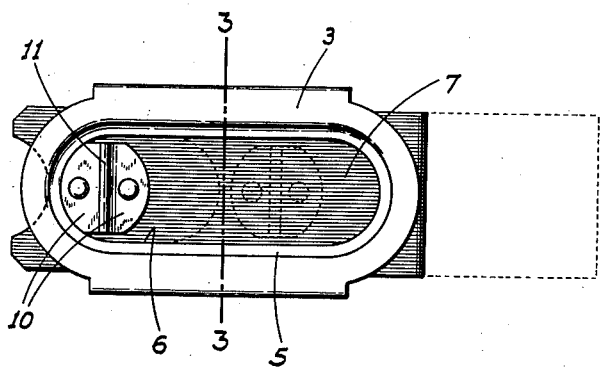
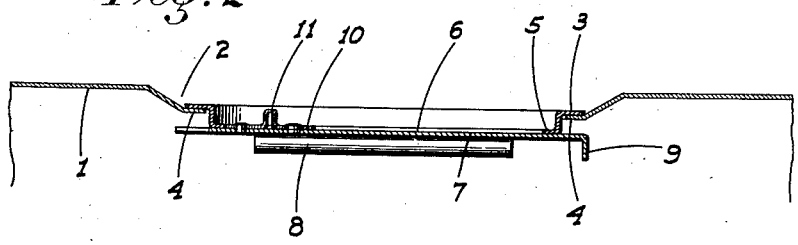
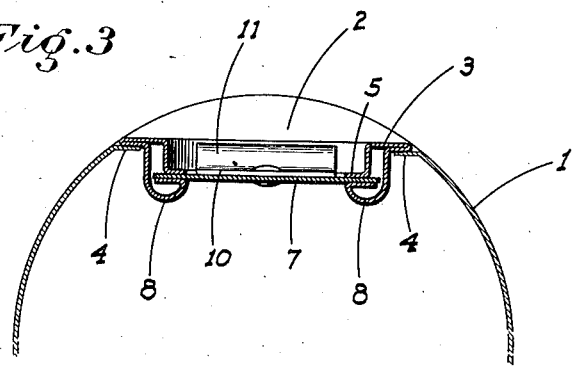
INVENTOR
Henry F. Congable
BY
Harry G. Schroeder
ATTORNEY Patented Mar. 23, 1937

2,074,502

UNITED STATES PATENT OFFICE 2,074,502

SHEET METAL GATE FOR IRRIGATION PIPES

Henry F. Congable, Oakland, Calif.

Application December 14, 1934, Serial No. 757,490

1 Claim. (Cl. 251—56)

This invention relates to irrigation pipe gates, and particularly to a gate of this character adapted to control an opening in one side of the pipe.

My main object is to provide a gate of this nature adapted to be mounted on the pipe, preferably at the factory, in such a manner that no part of the gate projects outwardly of the periphery of the pipe. By so doing, a number of lengths of pipe may be piled in close relation one on the other, or slid relative to each other, without any part of the gate structure catching or being knocked off, or damaged by being struck.

Another object is to provide a gate of this kind which is of extremely simple construction, without any parts to give trouble even after long use, and so that it is very cheap to manufacture, and yet very efficient in providing the necessary snug watertight fit.

These objects are carried out by the structure now to be described and as shown in the accompanying drawing, in which:

Figure 1 is a top plan view of the gate closed, and detached from the pipe;

Figure 2 is a longitudinal section of the gate as mounted on the pipe;

Figure 3 is a transverse section of the gate and pipe, on line 3—3 of Figure 1.

On the drawing, I denotes a standard type of sheet-metal irrigation pipe formed intermediate its ends with a longitudinal depression 2 in one side, in the bottom of which is an opening.

The gate comprises a flat oblong frame 3 adapted about its periphery to rest on and be soldered to the depressed ledge 4 of the pipe about the opening therein. Formed with the frame in depressed or countersunk relation thereto is an endless flange 5, surrounding an oblong opening 6, and of course projecting through the pipe opening so as to be within the pipe below the ledge 4.

Engaging the flange 5 from below is a rectangular flat gate 7, of larger area than the opening 6, and supported for sliding movement lengthwise of the pipe and opening by resilient guide flanges 8 depending from the frame lengthwise thereof inwardly of the pipe-ledge 4 as shown in Figure 3. These flanges are arranged to exert a yieldable upward pressure against the gate, holding the same firmly against the frame-flange 5, an action aided by the pressure of the water against the gate. At one end the gate is provided with a down turned stiffening flange 9.

Toward its opposite end, a handle element projects upwardly from the gate within the opening 6. This element comprises a pair of flat ears or pads 10 riveted on the gate, and formed at their adjacent ends with an upstanding transversely extending rib 11 forming a handle. This handle not only serves as a means by which the gate may be slid back and forth, but also braces the gate against transverse buckling. Said handle does not project above the top of the frame, so that it is not exposed where it can be easily damaged.

The pads 10 abut against the ends of the flange 5 at the limits of travel of the gate, thus not only forming stops to limit such travel, but also keeping the handle a sufficient distance away from the ends of the frame-depression so that no difficulty is had in grasping the handle either when the gate is fully closed or open. The depressing of the gate-engaging portion of the frame (the flange 5) not only permits the handle to be counter-sunk in the frame, but provides for the necessary sliding movement of the gate without possibility of contact with the pipe, and without having to make the frame any longer than (if as long as) the gate itself.

From the above description, it will be seen that a very simple and yet efficient gate has been provided. The form of the frame and gate is such that these parts may be easily stamped or pressed out of sheet metal, without any machining or similar operations being necessary. In assembling the parts, the gate is first slid into place in the frame, after which the handle element is mounted on the gate. This being done, the gate cannot then be separated from the frame as will be evident.

Having thus described my invention,

What I claim is:

A gate for irrigation pipes comprising an open frame adapted to be seated in the periphery of an opening in a pipe, the outer edge of said frame being provided with a radially extended peripheral supporting flange, and the inner edge of said frame being provided with a second flange extended radially inward, relatively spaced inwardly extended guide members having walls parallel with the side wall of said frame and provided with resilient portions terminating in flat flanges which are disposed opposite to portions of said inner flange and in positions nearer the longitudinal median line of the frame than said supporting flange, a gate slidably mounted between the inner flange and the flanges of said resilient members, and having frictional engagement therewith, and a handle projecting outwardly from said gate into the space surrounded by said frame and movable within a space lying between the planes of said flanges.

HENRY F. CONGABLE.